United States Patent
Russell et al.

(10) Patent No.: US 6,678,746 B1
(45) Date of Patent: Jan. 13, 2004

(54) PROCESSING NETWORK PACKETS

(75) Inventors: Lance W. Russell, Hollister, CA (US); Tung Nguyen, Cupoertino, CA (US); Mallikarjunan Mahalingam, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 539 days.

(21) Appl. No.: 09/630,033

(22) Filed: Aug. 1, 2000

(51) Int. Cl.[7] ................................................ G06F 3/00
(52) U.S. Cl. .......................... 710/1; 709/223; 709/238; 711/100
(58) Field of Search ............................ 710/1, 5, 15, 20, 710/31, 62, 63, 64, 29, 33, 52; 709/200, 230, 223, 238, 232; 711/100

(56) References Cited

U.S. PATENT DOCUMENTS

| | | | |
|---|---|---|---|
| 5,228,083 A | * | 7/1993 | Lozowick et al. .............. 380/9 |
| 5,351,243 A | * | 9/1994 | Kalkunte et al. .............. 370/92 |
| 5,361,372 A | * | 11/1994 | Rege et al. .................. 395/800 |
| 5,752,078 A | | 5/1998 | Delp et al. |
| 5,805,808 A | * | 9/1998 | Hasani et al. ................ 709/200 |
| 5,828,835 A | * | 10/1998 | Isfeld et al. ................. 709/200 |
| 5,946,318 A | * | 8/1999 | Post ............................ 370/412 |
| 5,948,079 A | | 9/1999 | Tsai et al. |
| 6,215,789 B1 | * | 4/2001 | Keenan et al. .............. 370/399 |
| 6,226,680 B1 | * | 5/2001 | Boucher et al. ............. 709/230 |
| 6,249,319 B1 | * | 6/2001 | Post ............................ 348/515 |
| 6,463,486 B1 | * | 10/2002 | Parry et al. ................... 710/52 |

FOREIGN PATENT DOCUMENTS

WO    WO 00/10302    2/2000

* cited by examiner

*Primary Examiner*—Jeffrey Gaffin
*Assistant Examiner*—Rijue Mai

(57) ABSTRACT

Systems and methods of processing network packets are described. These systems and methods provide improved packet processing results by logically and physically separating packet header processing functions from packet data processing functions. In this way, a network processing system may perform network handling operations and data processing operations substantially in parallel. One or more embodiments feature a network adapter for exchanging with a computer network information in the form of packets each including a packet header and packet data. The network adapter includes a packet parser configured to parse an information packet into a packet header and packet data and to direct the packet header to a first memory address for protocol processing and to direct packet data to a second memory address for data processing.

9 Claims, 4 Drawing Sheets

PROCESSING NETWORK PACKETS

TECHNICAL FIELD

This invention relates to systems and methods for processing network packets.

BACKGROUND

A computer network (e.g., a local area network (LAN) or a wide area network (WAN)) consists of a group of two or more computers that are linked together. The computers (or processing systems) of a computer network typically transmit information over the network in the form of packets. A number of different packet-based protocols have been defined to enable interconnected network computers to communicate with each other. Generally, a network protocol requires each processing system connected to the network to check, process and route control information contained in each information packet.

A network processing system typically includes a network adapter that supports data communication between the processing system and the computer network. The network adapter may have either a host-based architecture or a packet-based architecture. With a host-based architecture, a network adapter transfers information packets by direct memory access (DMA) to host memory within the processing system as the information packets are received. With a packet-based architecture, on the other hand, a network adapter typically receives an entire information packet into adapter memory before transferring the information packet to host memory.

A number of different schemes have been proposed to reduce latency between the time a packet is received and the time the packet is processed. For example, U.S. Pat. No. 5,752,078 describes a network adapter that prepares a DMA transfer of an information packet to host memory before the entire information packet has been received. The '078 purports that is packet processing approach reduces the user-perceived latency between the time an information packet is received by the network adapter and the time a user is notified that the information packet has been received. U.S. Pat. No. 5,948,079 describes a network peripheral device that transfers portions of a data packet to host memory in a non-sequential order to improve the efficiency with which the host system processes the data packet. International Patent Publication No. WO 00/10302 describes a programmable packet header processor that includes a plurality of parallel processing logic blocks for processing packet header information in accordance with one or more protocol handling operations. Still other packet processing schemes have been proposed.

SUMMARY

The invention provides improved packet processing results by logically and physically separating packet header processing functions from packet data processing functions. In this way, the invention enables a network processing system to perform network handling operations and data processing operations substantially in parallel.

In one aspect, the invention features a network adapter for exchanging with a computer network information in the form of packets each including a packet header and packet data. The network adapter comprises a packet parser configured to parse an information packet into a packet header and packet data and to direct the packet header to a first memory address for protocol processing and to direct packet data to a second memory address for data processing.

Embodiments of the invention may include one or more of the following features.

The network adapter preferably includes an adapter header memory, wherein the first memory address corresponds to a location in the adapter header memory. The network adapter also preferably includes an adapter processor that is operable to interrogate packet header information stored in the adapter header memory in accordance with one or more network protocol handling operations. The adapter processor may be operable to program the packet parser with the first and second memory addresses for each network connection.

In one embodiment, the packet parser is configured to parse the packet header into two or more header components and to direct each header component to a respective memory address. In this embodiment, the network adapter preferably includes two or more adapter processors each of which is operable to process a respective one or more stored header components substantially in parallel.

The network adapter may be incorporated into a data processing system having a host memory and a host processor. In one embodiment, the second memory address—to which packet data is directed for data processing—corresponds to a location in the host memory. The host processor preferably is operable to interrogate packet data stored in the host memory in accordance with one or more data processing operations.

In another embodiment, the network adapter includes an adapter data memory, wherein the second memory address corresponds to a location in the adapter data memory. In this embodiment, the network adapter preferably includes an adapter data processor that is operable to interrogate packet data stored in the adapter data memory in accordance with one or more data processing operations. The adapter data processor may be operable to perform encryption/decryption operations on packet data stored in the adapter data memory.

In another aspect, the invention features a processing system that includes a host memory, a host processor, and a network adapter for exchanging with a computer network information in the form of packets each including a packet header and packet data. The network adapter includes an adapter memory, an adapter processor, and a packet parser. The packet parser is configured to parse an information packet into a packet header and packet data and to direct the packet header to an adapter memory address for header processing by the adapter processor and to direct packet data to a host memory address for data processing by the host processor.

Another aspect of the invention features a packet processing method. In accordance with this method, an information packet is parsed into a packet header and packet data, and the packet header is directed to a first memory address for header processing and packet data is directed to a second memory address for data processing.

Other features and advantages of the invention will become apparent from the following description, including the drawings and the claims.

DETAILED DESCRIPTION

Figure 1:
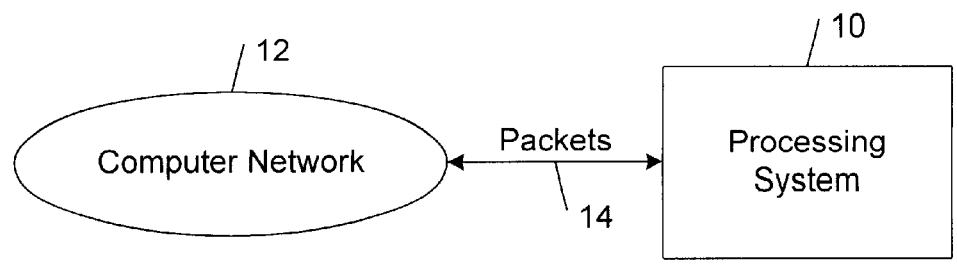
FIG. 1 is a diagrammatic view of a processing system coupled to a computer network.

Referring to FIG. 1, in one embodiment, a processing system 10 is connected to a computer network 12. Information is passed between processing system 10 and computer network 12 in the form of information packets 14. The information exchange is implemented in accordance with a supported network protocol (e.g., transmission control protocol/internet protocol (TCP/IP), IEEE 802.3 or DIX Ethernet data communication protocols, real-time transport (RTP) protocol, or the asynchronous transfer mode (ATM) protocol). The network protocol defines a common set of communication rules and the format of the data being transmitted through the network. Processing system 10 may be a personal computer, a workstation, a server computer, a router, a peer device or other network node.

Figure 2:
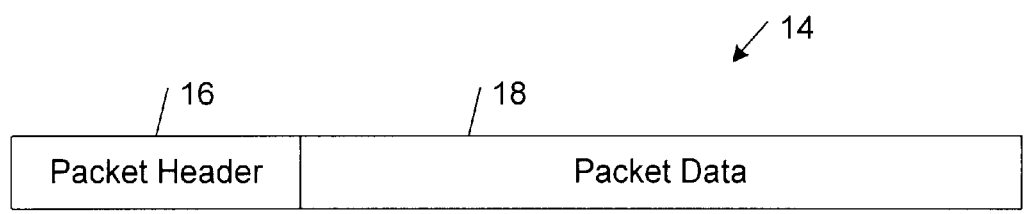
FIG. 2 is a diagrammatic view of an information packet.

As shown in FIG. 2, each information packet 14 includes a packet header 16 and packet data 18. Packet header 16 typically includes a number of fields that describe the contents of information packet 14, including a destination address field, a source address field, and a length/type field. The destination address field identifies one or more computers in network 12 that should receive the associated information packet. The source address field identifies the network computer that originated the associated information packet. The length/type field may identify the combined length (in bytes) of header 16 and packet data 18; alternatively, the length/type field may identify the type of network protocol used to format the associated information packet. In accordance with the supported network protocol, processing system 10 is configured to perform one or more protocol handling operations with respect to each packet received from network 12. For example, processing system 10 may be configured to interrogate packet header 16 to check, process and route control information contained in information packet 14.

Figure 3:
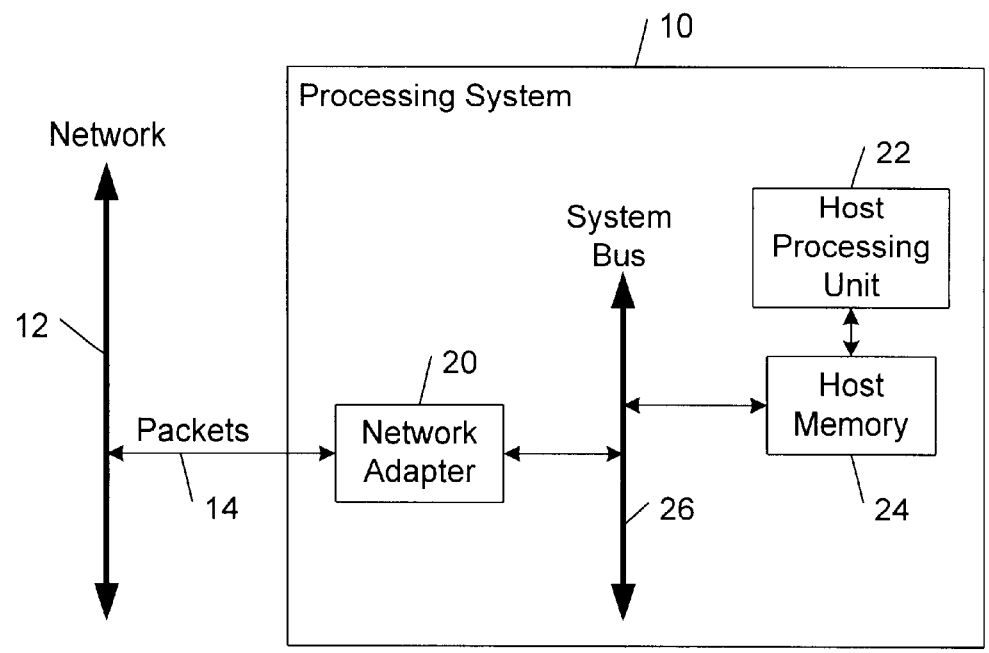
FIG. 3 is a block diagram of a processing system that includes a host processing unit, a host memory, and a network adapter.

Referring to FIG. 3, in one embodiment, processing system 10 includes a network adapter 20 that supports data communication between processing system 10 and network 12. Processing system 10 also includes a host processing unit 22 and a host memory 24. Host processing unit 22 may include one or more processors, each of which may be in the form of any one of various commercially available processors. Host processing unit 22 preferably runs under a multithreaded operating system (e.g., the UNIX operating system or the Windows NT Server operating system) and preferably is configured to execute communication software that supports network adapter 20. Host memory 24 preferably includes a read only memory (ROM) that stores a basic input/output system (BIOS) containing start-up routines for processing system 10, and a random access memory (RAM). In addition, host memory 24 may be divided into a global host (i.e., operating system) address space and a user address space. A system bus 26 couples host processing unit 22 to the various components of processing system 10. System bus 26 may be a memory bus, a peripheral bus or a local bus, and may be compatible with any one of a variety of bus protocols, including PCI, VESA, Microchannel, ISA, and EISA. Processing system 10 may include additional components, including memory devices (e.g., a hard drive, a floppy drive, and a CD ROM drive that are connected to system bus 26 by respective interfaces), input devices (e.g., a keyboard, a mouse, a microphone, a joystick, and a touch pad), and output devices (e.g., a monitor, speakers, and a printer).

As described above, improved packet processing results may be achieved by separating packet header processing operations from packet data processing operations to enable such operations to be performed substantially in parallel. In the following embodiments, a packet parser is configured to parse the packet header information and the packet data information on the fly to improve the packet processing performance of processing system 10.

Figure 4A:
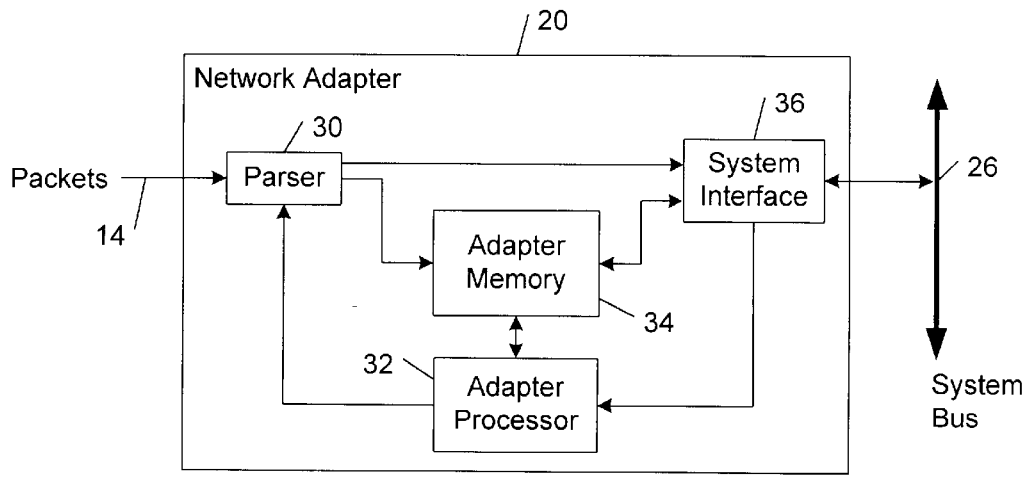
FIG. 4A is a block diagram of a network adapter.

Referring to FIG. 4A, in a host-based embodiment, network adapter 20 includes a packet parser 30, an adapter processor 32, an adapter memory 34, and a system interface 36. In operation, packet parser 30 interrogates a received information packet 14 (e.g., to determine the location where packet header 16 ends and packet data 18 begins). Next, packet parser 30 directs the packet header portion of information packet 14 to adapter memory 34 for header processing and directs the packet data portion of information packet 14 to system interface 36 for transmission to host memory 24 for data processing. Packet parser 30 includes a common reference tag with the packet header portion and the packet data portion for processes that must cross-reference packet header information with the associated packet data. For each network connection, adapter processor 32 programs packet parser 30 with an adapter memory address and a host memory address to which packet parser 30 should direct packet header 16 and packet data 18, respectively. Adapter processor 32 is configured to interrogate packet header information stored in adapter memory 34 in accordance with one or more network protocol handling operations (e.g., firewall filtering, load balancing, and TCP/IP or RTP protocol handling operations). System interface 36 may include a direct memory access (DMA) controller configured to arbitrate between network adapter 20, host memory 24, and other devices that perform DMA transfers over system bus 26. Packet data 18 may be transferred by DMA to host memory 24 as packet data is received by network adapter 20. Thus, host processing unit 22 may perform data processing operations on packet data 18 stored in host memory 24 substantially in parallel with the protocol handling operations performed by adapter processor 32.

Figure 4B:
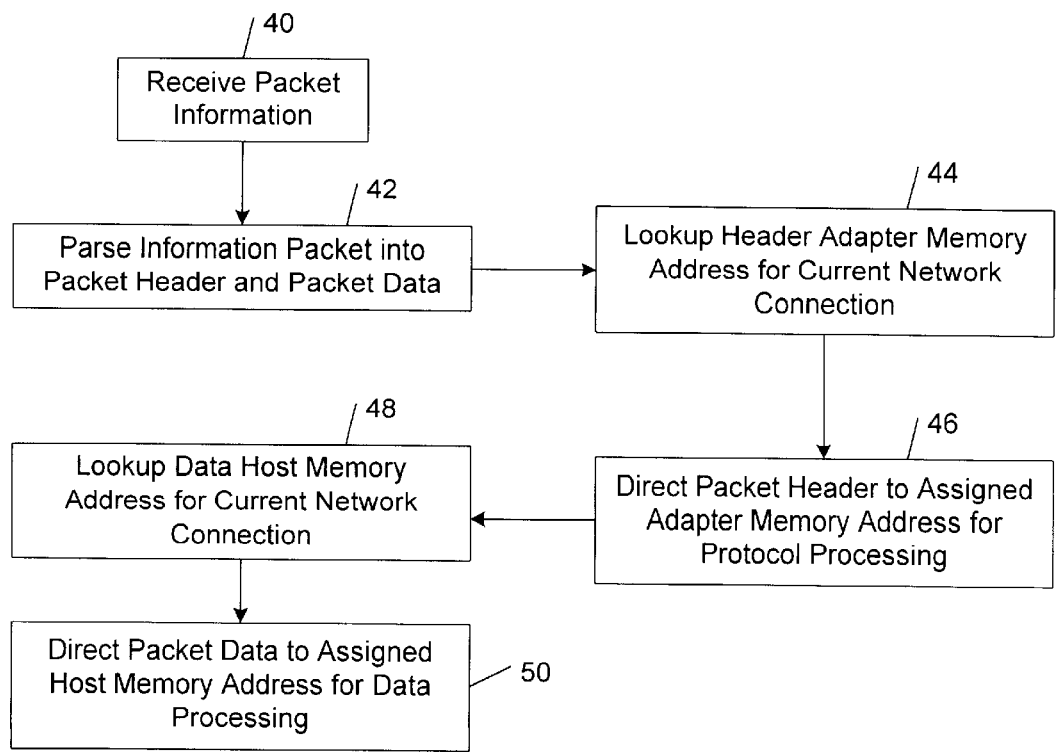
FIG. 4B is a flow diagram of a packet processing method performed by the network adapter implementation of FIG. 4A.

Referring to FIG. 4B, in one host-based packet processing method, packet parser 30 may process an information packet 14 as follows. Packet parser 30 receives information packet 14 from computer network 12 through a communication port of processing system 10 (step 40). Packet parser 30 interrogates information packet 14 and parses information packet 14 into packet header 16 and packet data 18 (step 42). Packet parser 30 includes a common reference tag with the packet header portion and the packet data portion for processes that must cross-reference packet header information with the associated packet data. Packet parser 30 retrieves the adapter memory address assigned by adapter processor 32 for storage of packet header 16 (step 44). Packet parser 30 directs packet header 16 to the assigned adapter memory address for header processing (e.g., network protocol handling operations) (step 46). Packet parser 30 also retrieves the host memory address assigned by adapter processor 32 for storage of packet data 18 (step 48). Packet parser 30 directs packet data 18 to the assigned host memory address for data processing (step 50).

Figure 5:
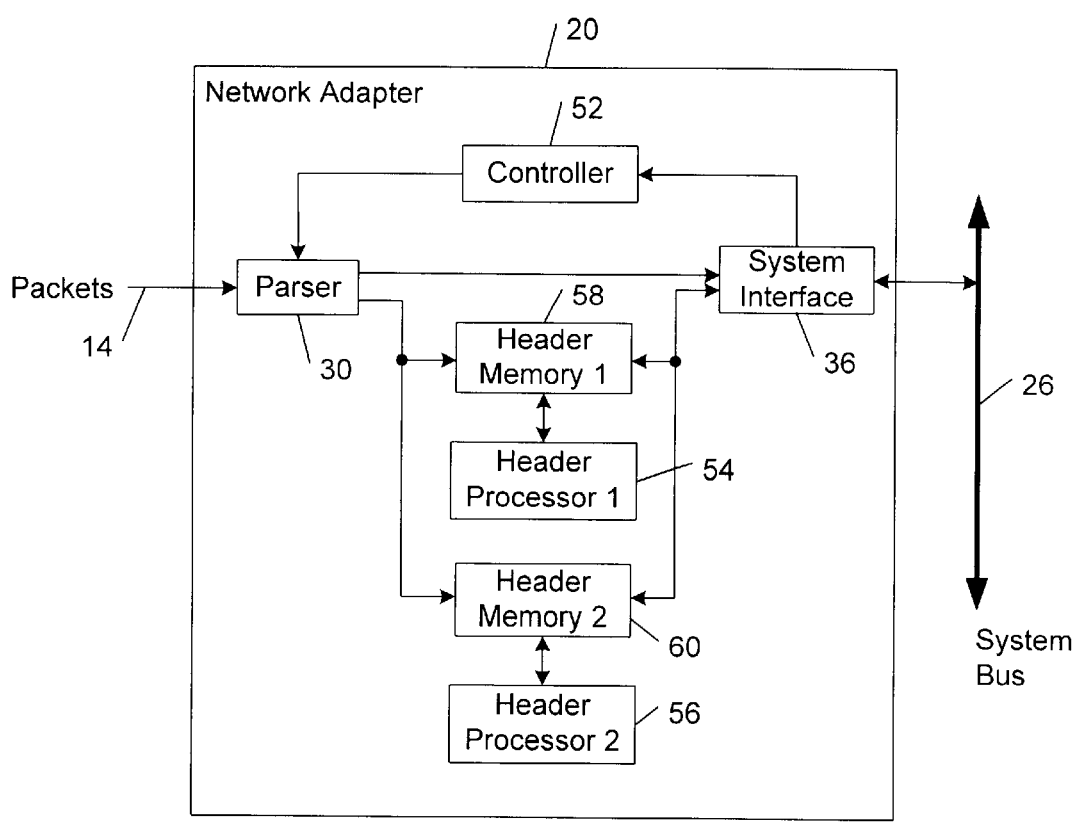
FIG. 5 is a block diagram of a network adapter.

Referring to FIG. 5, in another host-based embodiment, packet header processing may be performed substantially in parallel by two or more header processors. In this embodiment, network adapter 20 includes a packet parser 30, a controller 52, first and second header processors 54, 56, first and second header memories 58, 60, and a system interface 36. In operation, packet parser 30 parses a received information packet 14, and directs a portion of the packet header to first header memory 58 and directs the remaining portion of the packet header to second header memory 60. Packet parser 30 also directs the packet data portion of information packet 14 to system interface 36 for transmission to host memory 24 for data processing. Packet parser 30 includes a common reference tag with the packet header portion and the packet data portion for processes that must cross-reference packet header information with the associated packet data. For each network connection, controller 52 programs packet parser 30 with the first header memory address, the second header memory address and the host memory address to which packet parser 30 should direct the first header portion, the second header portion and packet data 18, respectively. First and second header processors 54, 56 are configured to process packet header information stored in header memories 58, 60 in accordance with one or more network protocol handling operations (e.g., firewall filtering, load balancing, and TCP/IP or RTP protocol handling operations). System interface 36 may include a direct memory access (DMA) controller that is configured to arbitrate between network adapter 20, host memory 24, and other devices that perform DMA transfers over system bus 26. Packet data 18 may be transferred by DMA to host memory 24 as packet data is received by network adapter 20. Thus, host processing unit 22 may perform data processing operations on packet data 18 stored in host memory 24 substantially in parallel with the protocol handling lo operations performed by first and second header processors 54, 56.

Other embodiments, may include additional header processors for processing respective portions of packet header 16. Each processor may be assigned a respective dedicated memory module (e.g., a register), or each processor may be assigned a respective memory space in a shared common memory (e.g., a RAM module).

Figure 6A:
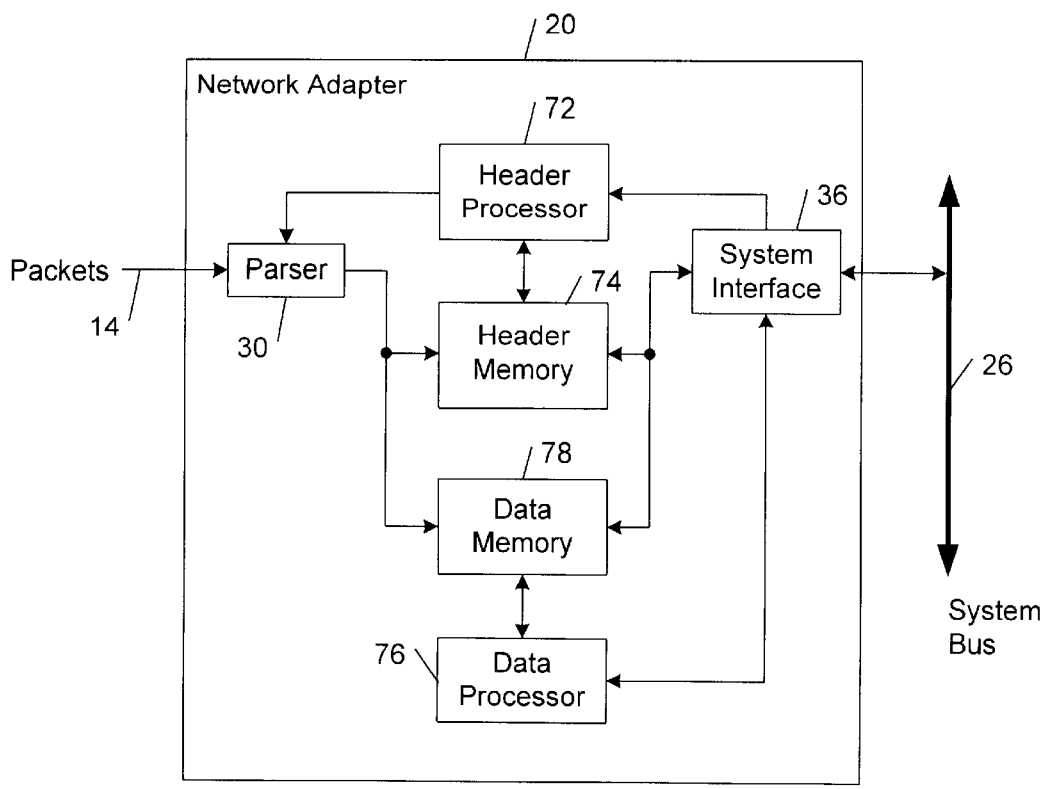
FIG. 6A is a block diagram of a network adapter.

Referring to FIG. 6A, in a non-host-based embodiment, network adapter 20 is configured to perform both header processing operations and data processing operations on a received information packet 14. In this embodiment, network adapter 20 includes a packet parser 30, a header processor 72, a header memory 74, a data processor 76, a data memory 78, and a system interface 36. In operation, packet parser 30 parses a received information packet 14, and directs the packet header portion of information packet 14 to header memory 74 for header processing and directs the packet data portion of information packet 14 to data memory 78 for data processing. Packet parser 30 includes a common reference tag with the packet header portion and the packet data portion for processes that must cross-reference packet header information with the associated packet data. For each network connection, header processor 72 programs packet parser 30 with a header memory address and a data memory address to which packet parser 30 should direct packet header 16 and packet data 18, respectively. Header processor 72 is configured to interrogate packet header information stored in header memory 74 in accordance with one or more network protocol handling operations (e.g., firewall filtering, load balancing, and TCP/IP or RTP protocol handling operations). Data processor 76 may perform one or more data processing operations (e.g., check-summing or other error detecting, or one or more data encryption/decryption operations) on packet data 18 stored in data memory 78. Data processor 76 may operate substantially in parallel with header processor 32.

Figure 6B:
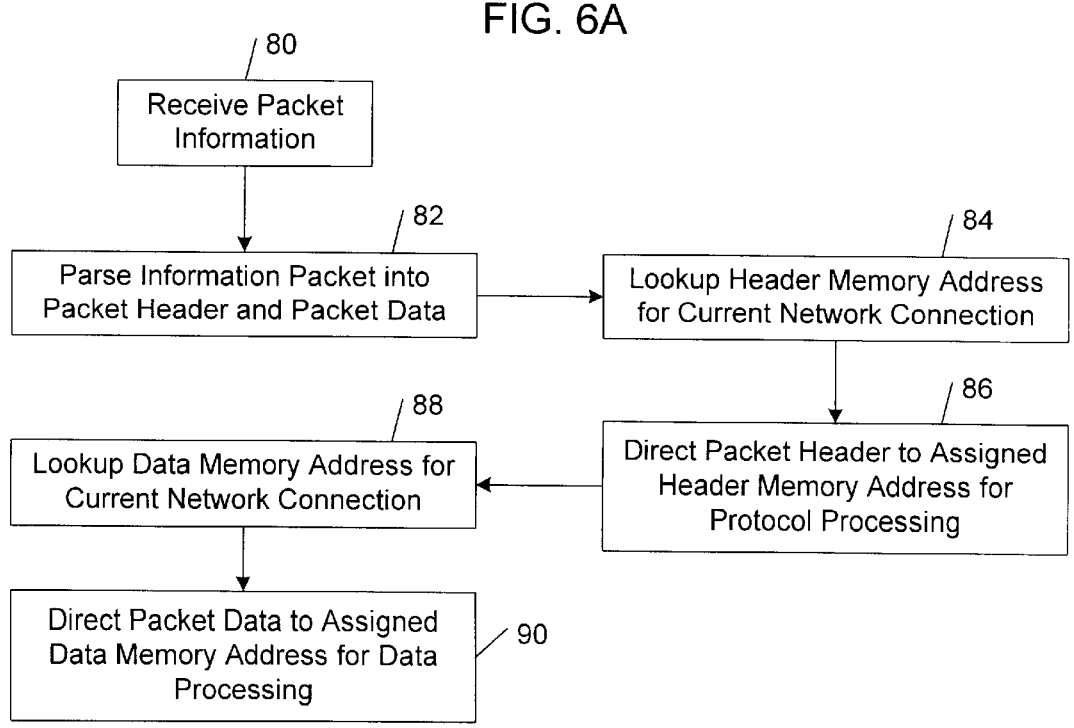
FIG. 6B is a flow diagram of a packet processing method performed by the network adapter implementation of FIG. 6A.

Referring to FIG. 6B, in one embodiment, the packet parser implementation of FIG. 6A may process an information packet 14 as follows. Packet parser 30 receives information packet 14 from computer network 12 through a communication port of processing system 10 (step 80). Packet parser 30 interrogates information packet 14 and parses information packet 14 into packet header 16 and packet data 18 (step 82). Packet parser 30 includes a common reference tag with the packet header portion and the packet data portion for processes that must cross-reference packet header information with the associated packet data. Packet parser 30 retrieves the header memory address assigned by header processor 72 for storage of packet header 16 (step 84). Packet parser 30 directs packet header 16 to the assigned header memory address for protocol processing (step 86). Packet parser 30 also retrieves the data memory address assigned by adapter processor 72 for storage of packet data 18 (step 88). Packet parser 30 directs packet data 18 to the assigned data memory address for data processing (step 90). Processed packet header information and processed packet data information may be transferred to host memory 24 by DMA through system interface 36.

The systems and methods described herein are not limited to any particular hardware or software configuration, but rather they may be implemented in any computing or processing environment. The packet parsers and adapter processors may be programmed using a high level procedural or object oriented programming language; however, the program may be implemented in assembly language or machine language, if desired. In any case, the programming language may be a compiled or interpreted language. For example, the parser implementations and adapter processors described above may be programmable logic devices (PLD's) that are programmed in VHDL (VLSI Hardware Description Language—IEEE 1164).

In addition, each of the above-described host-based embodiments may include a host processor interface for configuring a conventional host processor to receive and process packet data without preliminary host processing of the associated packet header. Such a host processor interface preferably is implemented in software, but may be implemented in firmware, if desired.

Other embodiments are within the scope of the claims.

What is claimed is:

1. A network adapter for exchanging with a computer network information in the form of packets each including a packet header and packet data, the network adapter comprising:

a packet parser configured to parse an information packet into a packet header and packet data and to direct the packet header to a first memory address for protocol processing and to direct packet data to a second memory address for data processing;

an adapter header memory, wherein the first memory address corresponds to a location in the adapter header memory; and an adapter processor operable to interrogate packet header information stored in the adapter header memory in accordance with one or more network protocol handling operations, wherein the adapter processor is operable to program the packet parser with the first and second memory addresses for each network connection.

2. The network adapter of claim 1, wherein the packet parser is configured to parse the packet header into two or more header components and to direct each header component to a respective memory address.

3. The network adapter of claim 1, wherein the network adapter is incorporated into a data processing system having a host memory and a host processor.

4. The network adapter of claim 3, wherein the second memory address corresponds to a location in the host memory.

5. The network adapter of claim 4, wherein the host processor is operable to interrogate packet data stored in the host memory in accordance with one or more data processing operations.

6. The network adapter of claim 1, further comprising an adapter data memory, wherein the second memory address corresponds to a location in the adapter data memory.

7. The network adapter of claim 6, further comprising an adapter data processor operable to interrogate packet data stored in the adapter data memory in accordance with one or more data processing operations.

8. A network adapter for exchanging with a computer network information in the form of packets each including a packet header and packet data, the network adapter comprising:

a packet parser configured to parse an information packet into a packet header and packet data and to direct the packet header to a first memory address for protocol processing and to direct packet data to a second memory address for data processing, wherein the packet parser is configured to parse the packet header into two or more header components and to direct each header component to a respective memory address; and two or more adapter processors each operable to process a respective one or more stored header components substantially in parallel.

9. A network adapter for exchanging with a computer network information in the form of packets each including a packet header and packet data, the network adapter comprising:

a packet parser configured to parse an information packet into a packet header and packet data and to direct the packet header to a first memory address for protocol processing and to direct packet data to a second memory address for data processing;

an adapter data memory, wherein the second memory address corresponds to a location in the adapter data memory; and an adapter data processor operable to interrogate packet data stored in the adapter data memory in accordance with one or more data processing operations, wherein the adapter data processor is operable to perform encryption/decryption operations on packet data stored in the adapter data memory.

* * * * *